March 25, 1941.  R. PRATER  2,236,219
MIXER
Filed Sept. 9, 1939
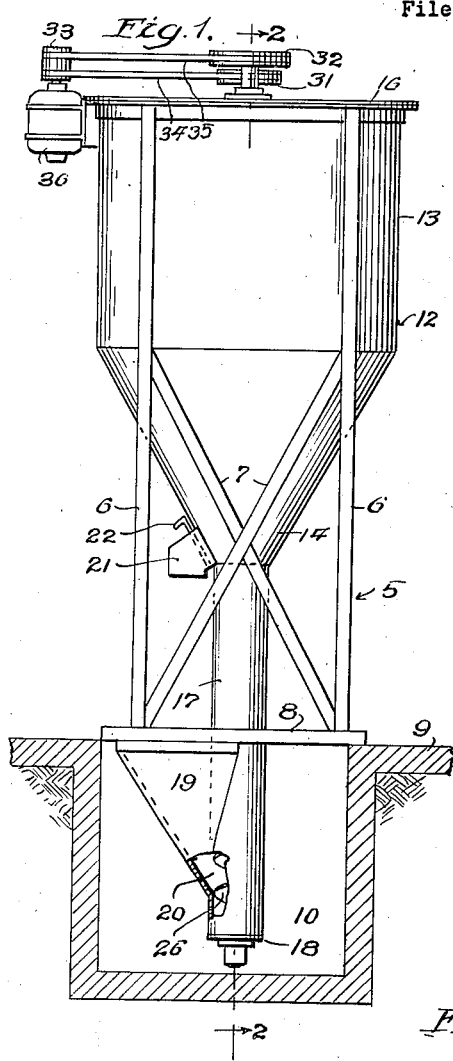
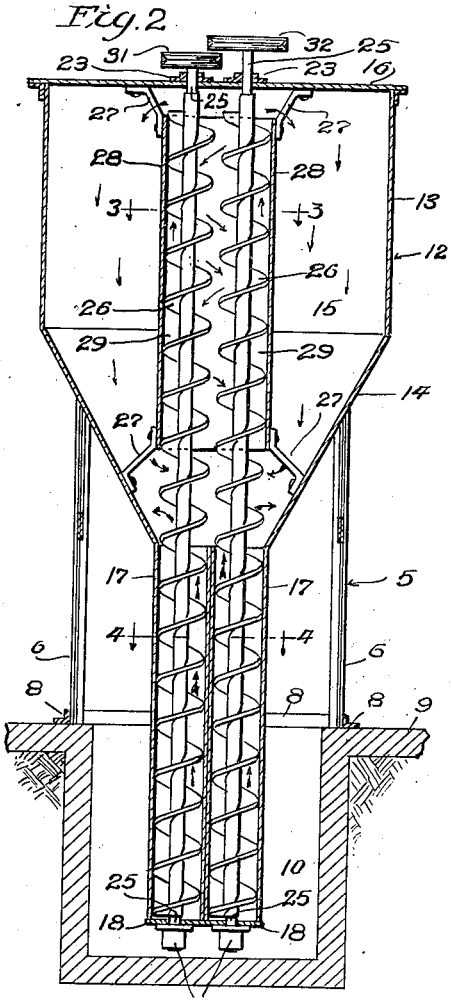
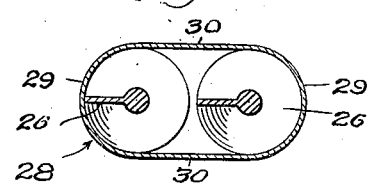
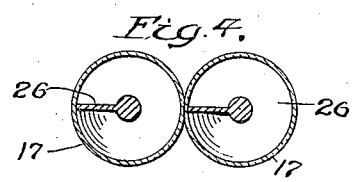
Inventor:
Ralph Prater,
by Charles G. Shurrey,
his Atty.

Patented Mar. 25, 1941

2,236,219

UNITED STATES PATENT OFFICE 2,236,219

MIXER

Ralph Prater, Hinsdale, Ill.

Application September 9, 1939, Serial No. 294,142

8 Claims. (Cl. 259—97)

This invention relates to mixers.

One of the objects of this invention is to provide an improved mixer for handling and thoroughly mixing all grains, and feeds, corn, oats, bran, middlings, alfalfa, etc., together with concentrates often used in the preparation of mixed feeds.

Another object is to provide a pair of or twin spiral conveyors rotating in a mixing conduit and acting to toss or throw the materials from the flights of each spiral conveyor to those of the other, whereby to more thoroughly mix the materials.

Another object is to provide a pair of or twin spiral conveyors for elevating the materials to a mixing chamber and through a mixing conduit where the materials are tossed or thrown from each conveyor to the other.

Another object is to prevent the formation of layers of different materials.

Another object is to provide a mixer which begins to mix the materials as soon as the second different material is loaded into the mixing chamber.

Another object is to provide a differential speed for the spiral conveyors whereby a more thorough mixing is obtained.

Other objects and advantages will appear in the course of this specification, and with all of said objects and advantages in view, this invention consists in the several novel features hereinafter fully set forth and claimed.

One embodiment of the invention is clearly illustrated in the drawing accompanying this specification in which:

Fig. 1 is a view, partly in side elevation and partly in vertical cross-section, of the mixer, showing it mounted over a pit in a floor.

Fig. 2 is a vertical cross section taken on the line 2—2 of Fig. 1.

Fig. 3 is an enlarged detail horizontal cross section taken on the line 3—3 in Fig. 2, and Fig. 4 is an enlarged detail cross section taken on the line 4—4 of Fig. 2.

Referring to said drawing, which is merely illustrative of one embodiment of the invention, the reference character 5 designates a supporting frame desirably composed of uprights 6, braces 7, and horizontal cross bars 8. The frame shown rests upon the floor 9 of a building in which the mixer is located, and in certain cases a pit, 10, is provided in the floor to receive the lower end of the mixer.

Supported by the frame is a hopper-like wall 12 composed of an upright part 13 and a conical part 14 extending down therefrom, and providing with the upright part a mixing chamber 15, wherein part of the mixing is done. The top of the mixing chamber is closed by a top wall 16, and extending down from the lower end of the conical part are two closely parallel conduits 17—17, which are closed at their lower end by walls 18. A receiving hopper 19 extends forward from the two conduits and delivers the material through openings 20 into the lower ends of the conduits 17. A spout 21 secured to the lower end of the conical wall 14 of the mixing chamber, over a discharge opening therein, and provided with a gate 22, affords means for discharging the mixed material from the mixing chamber.

Journaled in bearings 23, 24 secured to the top and bottom walls 16, 18 are the shafts 25—25 of two spiral conveyors 26—26, which extend from the lower ends of the conduits 17 to places adjacent the upper end of the mixing chamber 15. One function of the spiral conveyors is to elevate the materials through the conduits 17—17 and discharge the same into the lower end of the mixing chamber 15. Supported in the mixing chamber as by brackets 27 is a mixing conduit 28 which extends from a place located somewhat above the upper ends of the conduits 17 to a place adjacent the upper end of the mixing chamber. Desirably the mixing conduit 28 has semi-circular end walls 29 which form troughs in which the spiral conveyors rotate and said troughs may be connected by walls 30 that may be flat or slightly bowed if desired, thus providing a mixing conduit in which the spiral conveyors elevate the material and toss or throw it from the flights of each conveyor to those of the other, thereby very effectively intermixing the materials as they progress to the top of the mixing conduit, where the mixed materials are thrown out into the mixing chamber 15 and fall upon the materials in the lower part thereof. The gap between the lower end of the mixing conduit 28 and the conical wall 14 of the mixing chamber provides a passage from the mixing chamber to the parts of the spiral conveyors which are exposed between the adjacent ends of the two conduits 17 and the mixing conduit 28, thereby permitting material in the mixing chamber to flow to the spiral conveyors.

Suitable driving means are provided for the spiral conveyors and desirably they are driven at different speeds. The driving means shown comprises belt pulleys 31—32, one larger than the other, and mounted on the shafts of the spiral conveyors. The belt pulleys 31—32 are belted to a driving pulley 33 by belts 34, 35 and a motor 36 carried by the wall 12, has the pulley 33 mounted on its shaft and provides the power means. However, the belt pulleys 31—32 may be driven from any suitable source of power.

In operation the several kinds of materials to be mixed are deposited in the hopper 19, one after the other, and they flow into the lower ends of the two conduits 17. The spiral conveyors 26 elevate the materials through the two conduits to the gap below the mixing conduit 28, and when the space below the lower end of said mixing conduit has been filled, the spiral conveyors elevate the materials into the mixing conduit 28, and as the materials are elevated therein they are tossed from the flights of each spiral conveyor upon those of the other, thereby very effectively intermixing the different kinds of materials. At the upper end of the mixing conduit the spiral conveyors discharge the mixed materials into the mixing chamber 15 where they fall upon the materials at the bottom thereof. After the space below the lower end of the mixing conduit has been filled with materials and the spiral conveyors continue to elevate materials from the conduits 17 into said space, some of the materials in said space flow upon the flights of the conveyors and are carried up along with and mixed with materials elevated by the spiral conveyors. This mixing operation is more pronounced after all of the materials have been elevated to the gap between the conduits 17 and the mixing conduit 28, as the materials contained in the mixing chamber 15 gravitate to said gap and are again carried up by the spiral conveyors into the mixing conduit and again intermixed. This mode of operation continues until all of the materials have been thoroughly intermixed, after which the gate 22 may be opened, permitting the mixed materials to discharge through the spout 21 into bags or other containers.

I claim as new and desire to secure by Letters Patent:

1. A mixer comprising in combination a mixing chamber, two vertical opposed semi-circular mixing troughs therein, the walls of one being connected to those of the other to form a conduit, two vertical closely spaced spiral conveyors, one coaxial with and rotating in each semi-circular trough; said spiral conveyors being adapted to elevate materials in the conduit and throw them from the flights of each spiral conveyor upon those of the other one, the spiral conveyors extending below the lower end of the conduit, whereby material in the mixing chamber may flow upon the flights of the unshrouded parts of the conveyors, and driving means for said spiral conveyors.

2. A mixer comprising in combination a mixing chamber, a vertical mixing conduit therein having two oppositely disposed semi-circular mixing troughs, said conduit opening to the chamber at its top and bottom, two vertical closely spaced parallel spiral conveyors coaxial with said semi-circular troughs and extending through and rotating in said mixing conduit and having unshrouded parts below the mixing conduit, there being a passage for materials from the mixing chamber to the unshrouded parts of the spiral conveyors and the latter being arranged to elevate materials in the mixing conduit and throw materials from the flights of each conveyor to those of the other, and driving means for said spiral conveyors.

3. A mixer comprising in combination a mixing chamber, a vertical mixing conduit therein opening thereto at its top and bottom, two vertical closely spaced parallel spiral conveyors extending through and rotating in said mixing conduit and having unshrouded parts below the mixing conduit, there being a passage for materials from the mixing chamber to the unshrouded parts of the spiral conveyors and the latter being arranged to elevate materials in the mixing conduit and throw materials from the flights of each conveyor to those of the other, and differential speed driving means for driving said spiral conveyors at differential speeds.

4. A mixer comprising in combination a mixing chamber having a conical lower end terminating in a pair of adjacent parallel conduits, a vertical mixing conduit in said mixing chamber having oppositely disposed semi-circular side walls, said conduit opening at its top and bottom to said mixing chamber, two vertical spiral conveyors coaxial with the semi-circular side walls and extending through and rotating in said two conduits and the mixing conduit, said spiral conveyors being unshrouded between the two conduits and the mixing conduit, whereby materials in the mixing chamber may flow upon the flights of the spiral conveyors at said unshrouded parts thereof, said spiral conveyors acting to elevate materials and throw the materials from the flights of each spiral conveyor upon those of the other one in the mixing conduit, and acting to discharge mixing material from the upper end of the mixing conduit into the mixing chamber, and driving means for said spiral conveyors.

5. A mixer comprising in combination a mixing chamber having a conical lower end terminating in a pair of adjacent parallel vertical conduits, a vertical mixing conduit in said mixing chamber opening at its top and bottom to said mixing chamber, two vertical spiral conveyors extending through and rotating in said two conduits and mixing conduit, said spiral conveyors being unshrouded between the two conduits and the mixing conduit, whereby materials in the mixing chamber may flow upon the flights of the spiral conveyors at said unshrouded parts thereof, said spiral conveyors acting to elevate materials and throw the materials from the flights of each spiral conveyor upon those of the other one in the mixing conduit, and acting to discharge mixed material from the upper end of the mixing conduit into the mixing chamber, and differential driving means for driving said spiral conveyors at differential speeds.

6. A mixer comprising in combination a mixing chamber having a conical lower end, a pair of vertical parallel adjacent conduits closed at the bottom and opening at their upper ends to said mixing chamber, a vertical mixing conduit having opposing semi-circular trough-like parts disposed in co-axial alignment with the two aforesaid conduits, and said mixing conduit opening at its top and bottom to the mixing chamber, two vertical spiral conveyors coaxial with said semi-circular trough-like parts and extending through said two conduits and the mixing conduit, and rotating therein, the spiral conveyors serving to elevate materials through the two conduits and the mixing conduit and acting to throw materials in the mixing conduit from the flights of each spiral conveyor upon those of the other, the spaces between the two conduits and mixing conduit affording a passageway between the mixing chamber and spiral conveyors, and driving means for said spiral conveyors.

7. A mixer comprising in combination a mixing chamber having a conical lower end, a pair of vertical parallel adjacent conduits closed at the bottom and opening at their upper ends to said mixing chamber, a vertical mixing conduit having opposing semi-circular trough-like parts disposed in co-axial alignment with the two aforesaid conduits, and said mixing conduit opening at its top and bottom to the mixing chamber, two vertical spiral conveyors extending through said two conduits and the mixing conduit and rotating therein, the spiral conveyors serving to elevate materials through the two conduits and the mixing conduit and acting to throw materials in the mixing conduit from the flights of each spiral conveyor upon those of the other, the spaces between the two conduits and mixing conduit affording a passageway between the mixing chamber and spiral conveyors, and means for driving said spiral conveyors at differential speeds.

8. A mixer comprising in combination a mixing chamber having a conical lower end terminating in a pair of vertical adjacent parallel conduits closed at their lower ends, a receiving hopper opening to the lower portions of said conduits, a vertical mixing conduit in said mixing chamber having opposed semi-circular side walls, coaxially aligned with said two parallel conduits and opening at its top and bottom to the mixing chamber, two vertical spiral conveyors extending through and rotating in said two conduits and mixing conduit, said spiral conveyors being unshrouded between the two conduits and the mixing conduit, whereby materials in the mixing chamber may flow upon the flights of the conveyors at the unshrouded parts thereof, said spiral conveyors acting to elevate materials and throw the materials in the mixing conduit from the flights of each spiral conveyor upon those of the other, and driving means for said spiral conveyors.

RALPH PRATER.